(12) United States Patent
Gupta et al.

(10) Patent No.: US 11,200,369 B2
(45) Date of Patent: Dec. 14, 2021

(54) WEB ELEMENT PATH LOCATION IN DYNAMIC WEB PAGES

(71) Applicant: EMC IP Holding Company LLC, Hopkinton, MA (US)

(72) Inventors: Shubham Gupta, Jaipur (IN); Tirumala Rao Sangapu, Hyderabad (IN); Gyanendra Kumar Patro, Berhampur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/712,212

(22) Filed: Dec. 12, 2019

(65) Prior Publication Data

US 2021/0182470 A1    Jun. 17, 2021

(51) Int. Cl.
*G06F 40/154* (2020.01)
*G06F 16/80* (2019.01)
*G06F 16/957* (2019.01)
*G06F 40/143* (2020.01)

(52) U.S. Cl.
CPC ............ *G06F 40/154* (2020.01); *G06F 16/80* (2019.01); *G06F 16/9577* (2019.01); *G06F 40/143* (2020.01)

(58) Field of Classification Search
None
See application file for complete search history.

(56) References Cited

U.S. PATENT DOCUMENTS

| 2003/0200506 | A1 | 10/2003 | Abe et al. |
| 2006/0074930 | A1 | 4/2006 | Hsu et al. |
| 2015/0205778 | A1* | 7/2015 | Srivastava ............ G06F 16/245 707/755 |
| 2016/0246895 | A1* | 8/2016 | Kolam .................... H04L 67/02 |
| 2017/0236160 | A1* | 8/2017 | Oberoi .............. G06Q 30/0269 705/14.66 |
| 2018/0165179 | A1* | 6/2018 | Negi .................... G06F 11/3672 |
| 2020/0019583 | A1* | 1/2020 | Halfond ................ G06F 16/986 |

OTHER PUBLICATIONS

"Absolute vs. Relative Paths/Links," Sep. 6, 2017, <https://www.coffeecup.com/help/articles/absolute-vs-relative-pathslinks/>, pp. 1-2. (Year: 2017).*

(Continued)

*Primary Examiner* — Kyle R Stork
(74) *Attorney, Agent, or Firm* — Ryan, Mason & Lewis, LLP (57) ABSTRACT

An apparatus comprises at least one processing device configured to perform steps of receiving a request to determine a path to a given web element of a web page of a web application and parsing the web page to detect web elements of the web page including the given web element and one or more additional web elements. The at least one processing device is also configured to perform steps of identifying one or more of the additional web elements having designated characteristics and selecting one of the identified web elements based at least in part on locations of the identified web elements, relative to the given web element, in a tree structure of the web page. The at least one processing device is further configured to perform the step of determining the path to the given web element from the selected web element.

20 Claims, 8 Drawing Sheets

(56) References Cited

OTHER PUBLICATIONS toolsqa.com, "FireBug and FirePath in Selenium Webdriver, Selenium Tutorial," https://www.toolsqa.com/selenium-webdriver/xpath-firebug-firepath/, Dec. 12, 2019, 16 pages.

A. Sadovsky, "XPath Helper," https://chrome.google.com/webstore/detail/xpath-helper/hgimnogjllphhhkhlmebbmlgjoejdpjl?hl=en, Jul. 13, 2015, 1 page.

w3schools.com, "XPath Tutorial," https://www.w3schools.com/xml/xpath_intro.asp, Dec. 12, 2019, 6 pages.

\* cited by examiner

WEB ELEMENT PATH LOCATION IN DYNAMIC WEB PAGES

FIELD

The present invention relates generally to the field of information processing, and more particularly to techniques for managing web applications.

BACKGROUND

Web applications, also referred to as web apps, are application programs designed for delivery to users over a network, such as the Internet, through a browser interface. For example, web applications include client-server computer programs in which the client runs in a web browser and the web application is hosted in the server. Web applications may include web services and other website components that perform functions for users. To test web applications, or to perform various automation tasks in web applications, there is a need for determining the paths to particular web elements in web pages of web applications.

SUMMARY

Illustrative embodiments of the present disclosure provide techniques for determining web element path locations in dynamic web pages.

In one embodiment, an apparatus comprises at least one processing device comprising a processor coupled to a memory. The at least one processing device is configured to perform steps of receiving a request to determine a path to a given web element of a web page of a web application and parsing the web page of the web application to detect a plurality of web elements of the web page, the plurality of web elements comprising the given web element and one or more additional web elements. The at least one processing device is also configured to perform steps of identifying one or more of the additional web elements having one or more designated characteristics and selecting one of the identified web elements having the one or more designated characteristics based at least in part on locations of the identified web elements, relative to the given web element, in a tree structure of the web page of the web application. The at least one processing device is further configured to perform the step of selecting one of the identified web elements having the one or more designated characteristics, and determining the path to the given web element from the selected web element.

These and other illustrative embodiments include, without limitation, methods, apparatus, networks, systems and processor-readable storage media.

DETAILED DESCRIPTION

Figure 1:
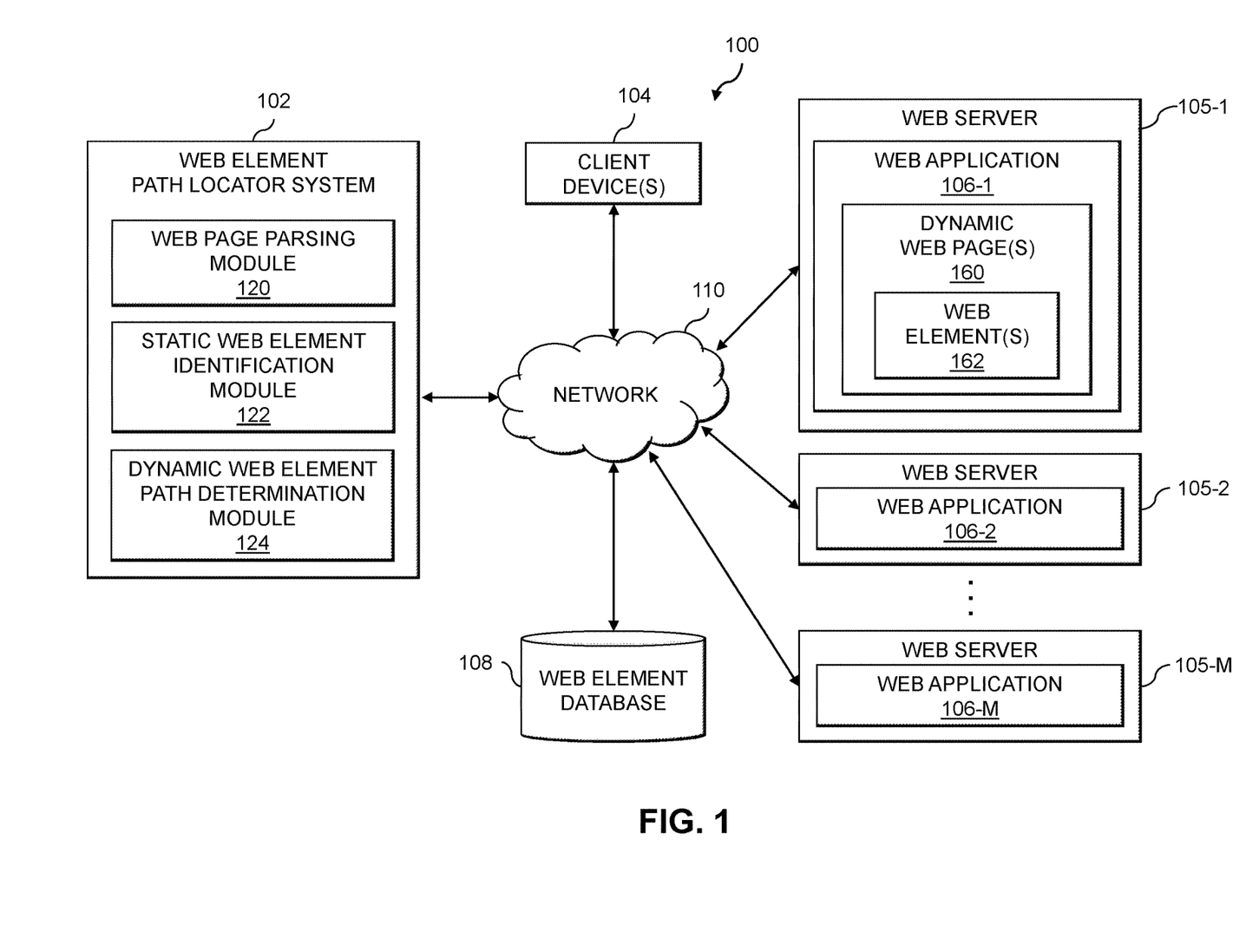
FIG. 1 is a block diagram of an information processing system for determining web element path locations in dynamic web pages in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources FIG. 1 shows an information processing system 100 configured in accordance with an illustrative embodiment. The information processing system 100 is assumed to be built on at least one processing platform and provides functionality for determining web element paths for "dynamic" web elements by defining paths to such dynamic web elements relative to "static" web elements in a web page of a web application. In the application areas of web testing and automation, finding the web element paths for dynamically changing web elements is a tedious task that can involve enormous manual effort, thus negatively affecting performance. Tools for finding web element paths often provide paths that cannot be used in the web testing and automation space, as the web element path locator values may change frequently. Such tools may generate a web element path based on a class or unique identifier (UID) of a web element, or by providing an absolute path from a root node. While such tools can work well in the case of static web pages, such tools fail in the case of dynamic web pages as the class, ID and absolute path may change at any time. Thus, web element paths generated by such tools can make web testing or automation "fragile" and prone to failure.

Illustrative embodiments advantageously determine web element paths for dynamic web elements relative to static web elements. Static web elements are assumed to remain stable, in terms of path location, even in the case of a dynamic web page. As will be described in further detail below, some embodiments characterize text field web elements as static web elements, and determine the path for dynamic web elements based on or relative to static text field web elements. The information processing system 100 includes a web element path locator system 102, one or more client devices 104, a set of web servers 105-1, 105-2, . . .

105-M (collectively, web servers 105) hosting respective web applications 106-1, 106-2, ... 106-M (collectively, web applications 106), and a web element database 108 that are coupled via a network 110. While in FIG. 1 each of the web servers 105 is shown as hosting a single one of the web applications 106, it should be appreciated that in other embodiments a single web server may host multiple web applications.

The web applications 106, in some embodiments, are assumed to be implemented as client-server computer programs in which the client runs in web browsers on the client devices 104 and the web applications 106 are hosted on the web servers 105. As shown in FIG. 1, the web application 106-1 includes one or more "dynamic" web pages 160 with a set of web elements 162. The dynamic web pages 160 are assumed to comprise one or more web elements 162 whose paths change over time, thus rendering absolute paths to a root node or paths based on class or ID of the web elements 162 not suitable for various application areas including but not limited to web testing of the web applications 106, automation tasks, etc. Although not explicitly shown in FIG. 1, other ones of the web applications 106-2 through 106-M are assumed to similarly comprise one or more dynamic web pages containing sets of web elements.

The client devices 104 may comprise, for example, physical computing resources including physical hardware such as servers, storage systems, networking equipment, Internet of Things (IoT) devices, mobile telephones, laptop computers, tablet computers, desktop computers or other types of devices, in any combination. Such devices are examples of what are more generally referred to herein as "processing devices." Some of these processing devices are also generally referred to herein as "computers." The client devices 104 may also or alternately comprise virtualized computing resources, such as virtual machines (VMs), software containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 110 is assumed to comprise a global computer network such as the Internet, although other types of networks can be part of the network 110, including a wide area network (WAN), a local area network (LAN), a satellite network, a telephone or cable network, a cellular network, a wireless network such as a WiFi or WiMAX network, or various portions or combinations of these and other types of networks.

The web element path locator system 102 may store various information relating to web elements of the web applications 106 in the web element database 108. Such information may include, by way of example, lists of web elements that are part of the different web applications 106, web element type data (e.g., for static and dynamic web elements as described in further detail elsewhere herein), etc. Although shown as being implemented external to the web element path locator system 102 in FIG. 1, it should be appreciated that in some embodiments the web element database 108 may be implemented at least partially internal to the web element path locator system 102. The web element database 108 may be any type of database or other data store configured to store such information.

The web element database 108 in some embodiments is implemented using one or more storage systems or devices associated with the web element path locator system 102. In some embodiments, one or more of the storage systems utilized to implement the web element database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the web element path locator system 102, as well as to support communication between the web element path locator system 102 and other related systems and devices not explicitly shown.

The client devices 104 may implement host agents that are configured to interact with the web element path locator system 102. For example, the host agents may run in web browsers or as part of other software or services on the client devices 104, so that when users of the client devices 104 request the paths for web elements of the web applications 106, the host agents of the client devices 104 invoke the web element path locator system 102 to determine the web element paths. The web element path locator system 102 may also be configured to push information to the client devices 104 via the host agents, such as on determining that web element paths have changed or that previously-provided web element paths are no longer valid, etc. It should be noted that a "host agent" as this term is generally used herein may comprise an automated entity, such as a software entity running on a processing device. Accordingly, a host agent need not be a human entity.

Although shown as external to the client devices 104 in the FIG. 1 embodiment, it should be appreciated that the web element path locator system 102 and web element database 108, or portions thereof, may be implemented at least in part internal to one or more of the client devices 104 in some embodiments.

The web element path locator system 102 in the FIG. 1 embodiment is assumed to be implemented using at least one processing device. Each such processing device generally comprises at least one processor and an associated memory, and implements one or more functional modules for controlling certain features of the web element path locator system 102, such as a web page parsing module 120, a static web element identification module 122 and a dynamic web element path determination module 124.

The web element path locator system 102 is configured to receive requests for paths to web elements in web pages of the web applications 106 from the client devices 104. For example, a request may be received to determine the path to a given one of the web elements 162 in one of the dynamic web pages 160 of the web application 106-1. If the given web element is a dynamic web element in the dynamic web page 160 of the web application 106-1, its path may change over time.

The web page parsing module 120 is configured to parse the dynamic web page 160 containing the given web element to determine a plurality of web elements therein (e.g., including the given web element and one or more additional web elements). The web page parsing module 120 may be configured to generate or analyze a tree structure of the dynamic web page 160 to determine the plurality of web elements. The static web element identification module 122 is configured to identify ones of the additional web elements that have one or more designated characteristics (e.g., indicative of static or stable web elements whose location or path is not likely to change over time, such as text fields in the dynamic web page 160).

The dynamic web element path determination module 124 is configured to select one of the static web elements identified by the static web element identification module 122, and to determine the path to the given web element from the selected static web element. The selection of the static web element may be based at least in part on locations of the static web elements, relative to the given web element, in a tree structure of the dynamic web page 160 of the web application 106-1. In some embodiments, this involves determining whether respective ones of the static web elements are in a same branch of the tree structure of the dynamic web page 160 as the given web element, and determining traversal paths (e.g., numbers of traversal steps) for reaching the given web element from each of the static web elements of the dynamic web page 160. The selection of one of the static web elements may comprise selecting a static web element with the shortest traversal path in the same branch as the given web element or, if no static web elements are in the same branch as the given web element, selecting the static web element with the shortest path.

At least portions of the web page parsing module 120, the static web element identification module 122 and the dynamic web element path determination module 124 may be implemented at least in part in the form of software that is stored in memory and executed by a processor.

It is to be appreciated that the particular arrangement of the web element path locator system 102, client devices 104, web applications 106 and web element database 108 illustrated in the FIG. 1 embodiment is presented by way of example only, and alternative arrangements can be used in other embodiments. In some embodiments, for example, there may be multiple instances of the web element path locator system 102 for different subsets of the client devices 104, or for different subsets of the web applications 106. Further, the web element path locator system 102 may in some embodiments be implemented on one or more of the client devices 104, or on web servers 105 hosting one or more of the web applications 106. As another example, the functionality associated with the web page parsing module 120, the static web element identification module 122 and the dynamic web element path determination module 124 may be combined into fewer modules, or separated across more modules with the multiple modules possibly being implemented with multiple distinct processors or processing devices.

It is to be understood that the particular set of elements shown in FIG. 1 for determining web element paths in dynamic web pages using the web element path locator system 102 is presented by way of illustrative example only, and in other embodiments additional or alternative elements may be used. Thus, another embodiment may include additional or alternative systems, devices and other network entities, as well as different arrangements of modules and other components.

The web element path locator system 102 may be part of cloud infrastructure as will be described in further detail below. The cloud infrastructure hosting the web element path locator system 102 may also host one or more of the client devices 104, one or more of the web applications 106, the web element database 108, or other components of the information processing system 100.

The web element path locator system 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The web element path locator system 102, client devices 104, web servers 105 hosting the web applications 106, and web element database 108 or components thereof may be implemented on respective distinct processing platforms, although numerous other arrangements are possible. For example, in some embodiments at least portions of the web element path locator system 102, client devices 104 and web servers 105 hosting the web applications 106 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the web element path locator system 102, client devices 104, web servers 105 hosting the web applications 106, and the web element database 108, or portions or components thereof, to reside in different data centers. Numerous other distributed implementations are possible. The web element path locator system 102 or portions thereof can also be implemented in a distributed manner across multiple data centers.

Additional examples of processing platforms utilized to implement the web element path locator system 102 and other portions of the system 100 in illustrative embodiments will be described in more detail below in conjunction with FIGS. 7 and 8.

It is to be appreciated that these and other features of illustrative embodiments are presented by way of example only, and should not be construed as limiting in any way.

An exemplary process for determining web element path locations in dynamic web pages will now be described in more detail with reference to the flow diagram of FIG. 2. It is to be understood that this particular process is only an example, and that additional or alternative processes for determining web element path locations in dynamic web pages may be used in other embodiments.

In this embodiment, the process includes steps 200 through 208. These steps are assumed to be performed by the web element path locator system 102 utilizing the web page parsing module 120, the static web element identification module 122 and the dynamic web element path determination module 124. The process begins with step 200, receiving a request to determine a path to a given web element of a web page of a web application. In step 202, the web page of the web application is parsed to detect a plurality of web elements of the web page, the plurality of web elements comprising the given web element and one or more additional web elements. Step 202 may include generating a Document Object Model (DOM) tree structure comprising nodes representing the plurality of web elements. The request received in step 200 may be a request to determine the path for a dynamic web element, such as a web element having an absolute path to a root node of the DOM tree structure that changes over time, or a web element whose class or UID changes over time.

In step 204, one or more of the additional web elements having one or more designated characteristics are identified. Step 204 may include identifying ones of the additional web elements that comprise text fields of the web page of the web application. For example, the web page of the web application may comprise a Hypertext Markup Language (HTML) page, and identifying the additional web elements that comprise text fields may comprise identifying ones of the additional web elements that have designated HTML tags corresponding to text fields, such as header HTML tags, paragraph HTML tags, label HTML tags, etc.

One of the identified web elements having the one or more designated characteristics is selected in step 206, based at least in part on locations of the identified web elements relative to the given web element in a tree structure (e.g., the DOM tree structure) of the web page of the web application. Step 204 may include identifying two or more of the additional web elements having the one or more designated characteristics. Selecting one of the identified web elements in step 206 may be based at least in part on respective numbers of steps for traversing the DOM tree structure to the given web element from each of the two or more additional web elements having the one or more designated characteristics. Selecting one of the identified web elements in step 206 may be further or alternatively be based at least in part on whether respective ones of the two or more additional web elements having the one or more designated characteristics lie in a same branch of the DOM tree structure as the given web element.

In some embodiments, step 206 includes determining whether at least a subset of the identified web elements lie in a same branch of the DOM tree structure as the given web element. Responsive to determining that at least a subset of the identified web elements lie in the same branch of the DOM tree structure as the given web element, step 206 may include selecting the identified web element in the subset that has a shortest traversal path to the given web element. Responsive to determining that none of the identified web elements lie in the same branch of the DOM tree structure as the given web element, step 206 may include selecting the identified web element that has a shortest traversal path to the given web element.

Figure 2:
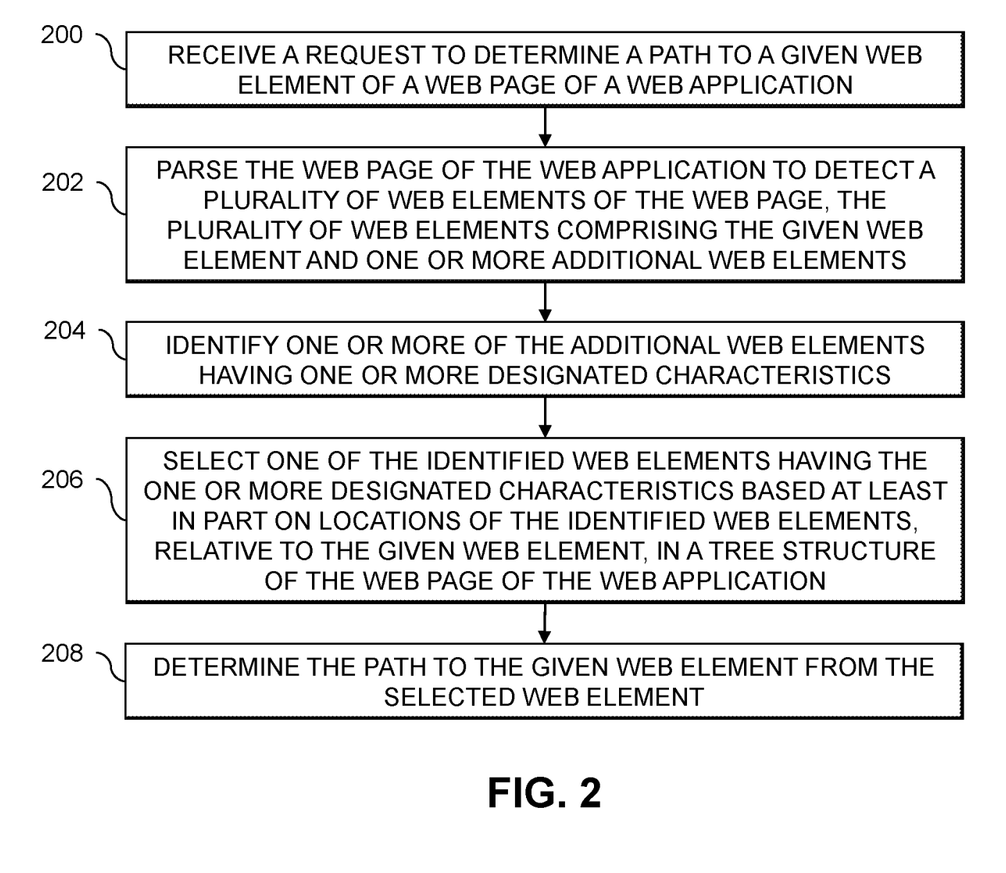
FIG. 2 is a flow diagram of an exemplary process for determining web element path locations in dynamic web pages in an illustrative embodiment.

The FIG. 2 process concludes with step 208, determining the path to the given web element from the selected web element. The path may then be returned to a requesting user or client device. The path to the given web element may comprise an Extensible Markup Language (XML) Path Language (XPath) path, defined using one or more XPath axes and operators. The path determined in step 208 may comprise a first portion specifying the selected web element and a second portion specifying a traversal path of the DOM tree structure from the selected web element to the given web element.

In some embodiments, step 204 includes identifying one or more fields of the given web element as having the one or more designated characteristics. In such cases, step 208 may include determining the path to the given web element from the one or more fields of the given web element having the one or more designated characteristics.

Illustrative embodiments provide techniques for finding a path to a dynamic web element in a web page of a web application using static web elements in the web page as references. As used herein, an invariable or static web element refers to a web element that changes relatively infrequently (e.g., as defined by some designated threshold frequency). Certain types of web elements are less likely to change frequently, and thus may be used as invariable or static web elements to determine the path for dynamic web elements that are likely to change frequently (e.g., as defined by some designated threshold frequency). From the closest invariable or static web element, the tree structure of the web page is traversed back to the node of the dynamic web element for which the path is to be determined. In the description below, it is assumed that the path to the dynamic web element is determined using XPath. XPath may be used as a query language for selecting web elements from a web page of a web application using path expressions, including Xpath axes and operators.

Figure 3:
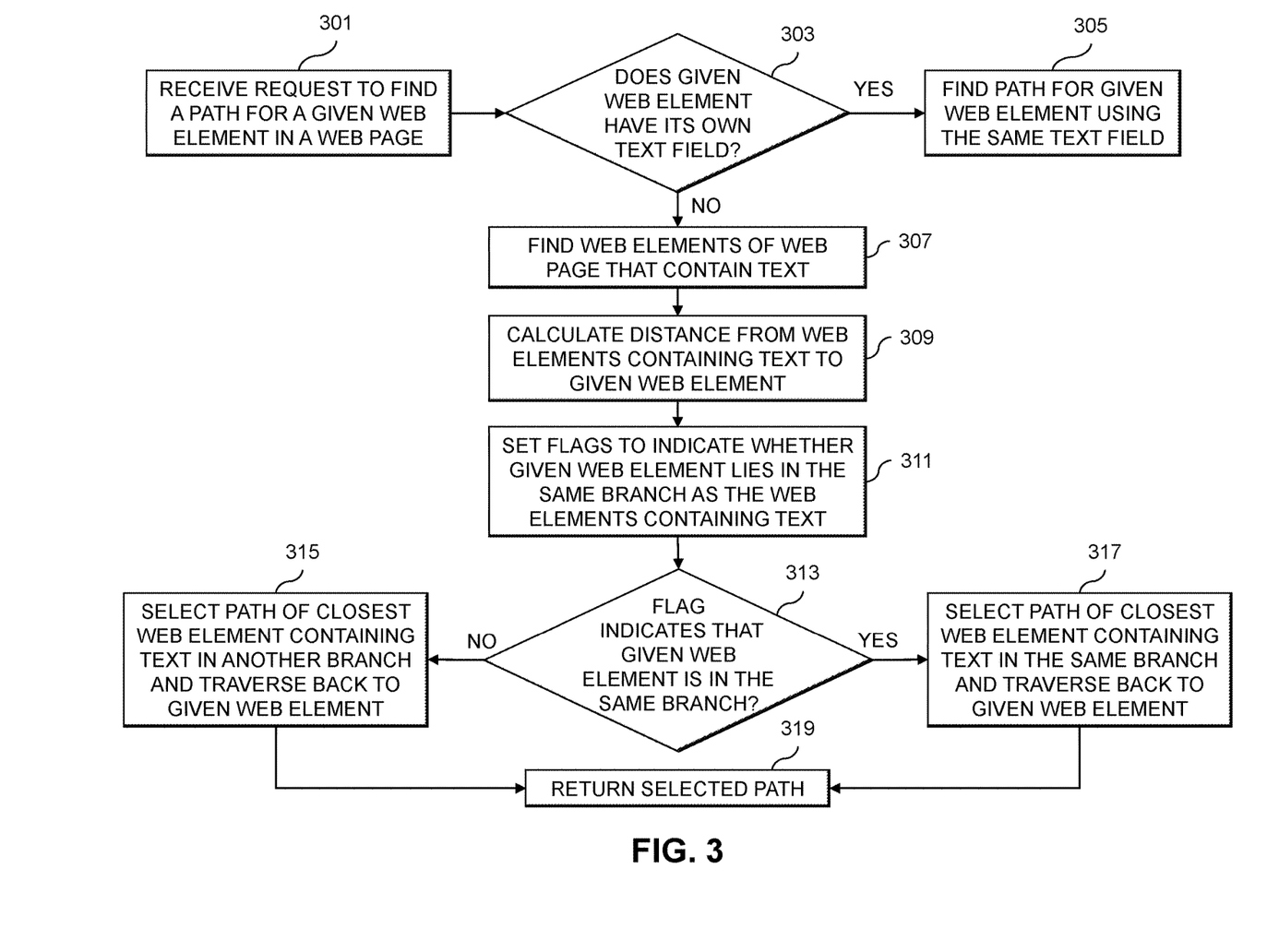
FIG. 3 is a flow diagram of an exemplary process for determining a path to a dynamic web element relative to a text field web element of a dynamic web page in an illustrative embodiment.

In some embodiments, web elements that contain text are assumed to be invariable or static web elements that change relatively infrequently. Examples of web elements that contain text include HTML tags such as header (e.g., <head>) tags, paragraph (e.g., <p>) tags, label (e.g., <label>) tags, etc. FIG. 3 shows a flow diagram for determining the path to a dynamic web element relative to a text field web element of a dynamic web page. The FIG. 3 process begins in step 301 with receiving a request to find a path (e.g., an XPath) for a given web element in a web page. In step 303, a determination is made as to whether the given web element has its own text field. If the given web element has its own text field, the given web element is assumed to comprise an invariable or static web element and the FIG. 3 process proceeds to step 305, finding the path to the given web element using the text field thereof. If the result of the step 303 determination is no (e.g., that the given web element does not have its own text field), then the FIG. 3 process proceeds to step 307. It should be noted that step 303 may more generally involve determining whether the given web element is static or dynamic, as embodiments are not limited solely to using or treating text field web elements as invariable or static web elements. In other embodiments, other types of web elements may be assumed to be invariable or static as desired, or specific web elements may be designated as static or dynamic by a user, by consulting a web element database such as web element database 108, by analyzing changes in paths of a web page over time to determine how often the paths to web elements change, etc.

In step 307, the web page is searched to find web elements thereof that contain text. More generally, step 307 includes parsing or searching the web page to find invariable or static web elements. The distances from the web elements containing text (or, more generally, the invariable or static web elements) to the given web element are calculated in step 309. In step 311, flag values are set to indicate whether the given web element lies in the same branch, of a tree structure representing web elements of the web page, as any of the web elements containing text. By the same branch, it is meant that it is possible to traverse from the web element containing text to the given web element by going only "up" or "down" the tree structure, not both "up" one branch and "down" another or vice versa.

The FIG. 3 process then moves to step 313, where a determination is made as to whether the flag values indicate that the given web element is in the same path as one or more of the web elements containing text. If the result of the step 313 determination is no, the FIG. 3 process proceeds to step 315, selecting the path of the closest web element containing text in another branch of the tree structure representing web elements of the web page, and traversing back to the given web element. If the result of the step 313 determination is yes, the FIG. 3 process proceeds to step 317, selecting the path of the closest web element containing text in the same branch of the tree structure representing web elements of the web page, and traversing back to the given web element. From steps 315 and 317, the FIG. 3 process proceeds to step 319 where the selected path is returned for the given web element.

Figure 4:
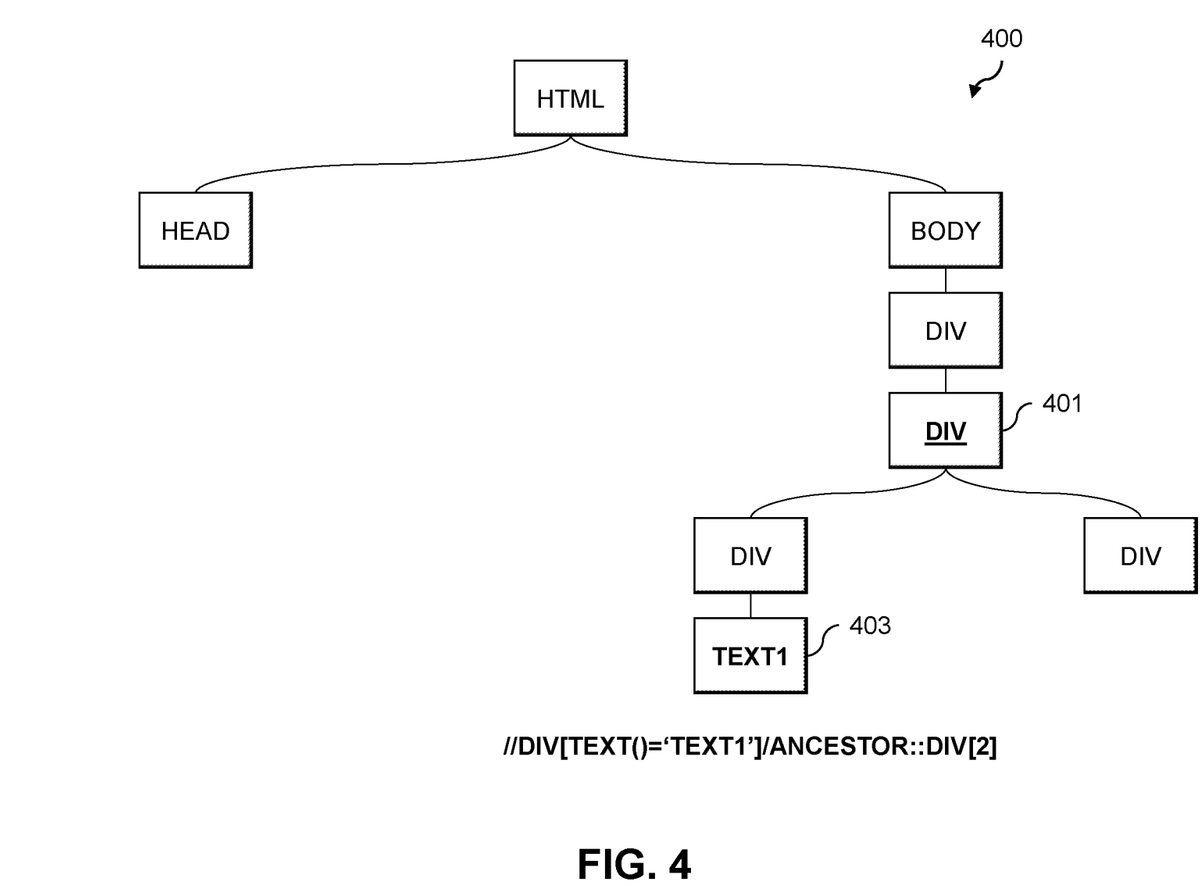
FIG. 4 is an example of determining a path to a dynamic web element in a dynamic web page comprising a single text field web element in an illustrative embodiment.
Figure 5:
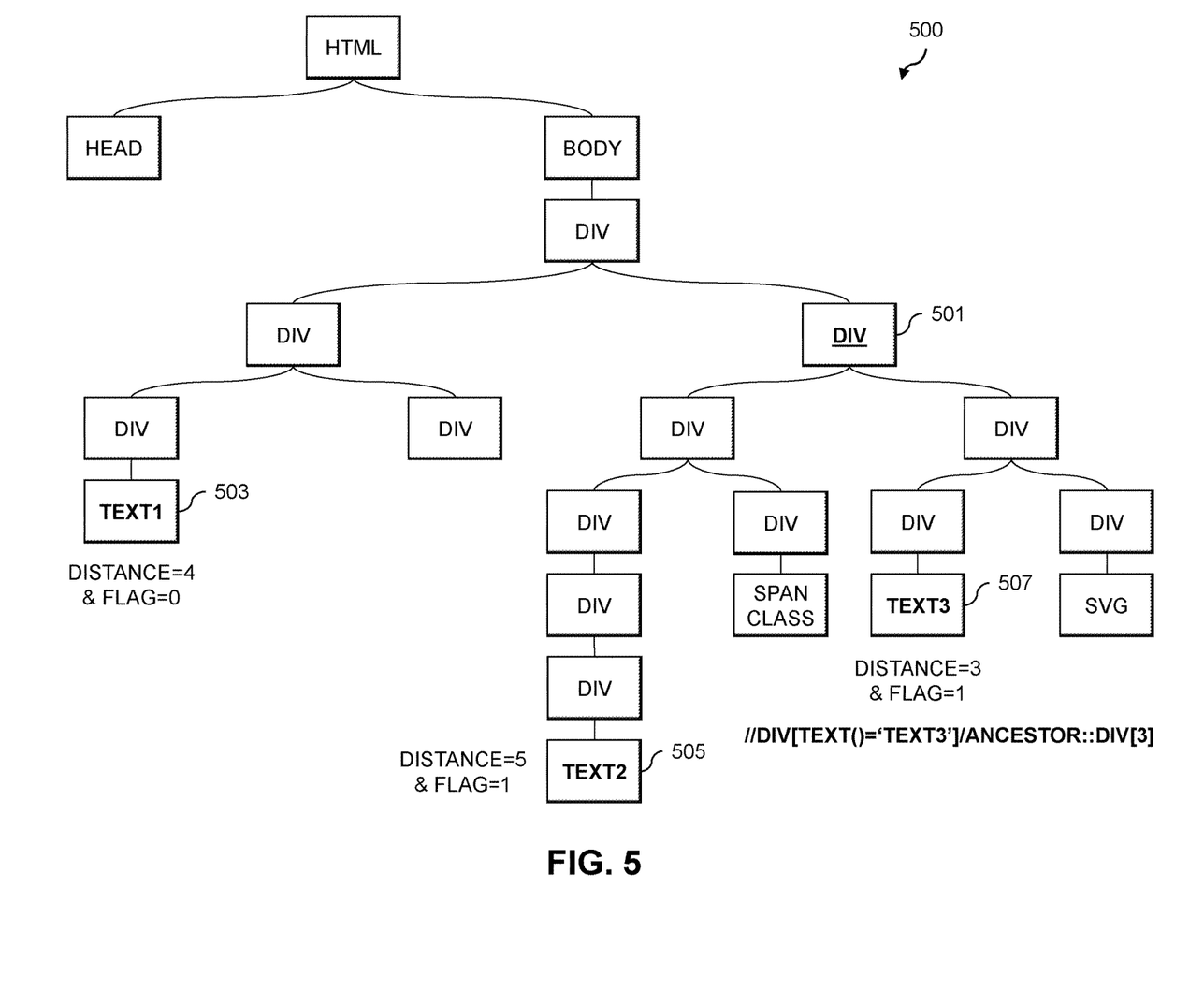
FIG. 5 is an example of determining a path to a dynamic web element in a dynamic web page comprising multiple text field web elements that are part of a same branch as the dynamic web element in an illustrative embodiment.
Figure 6:
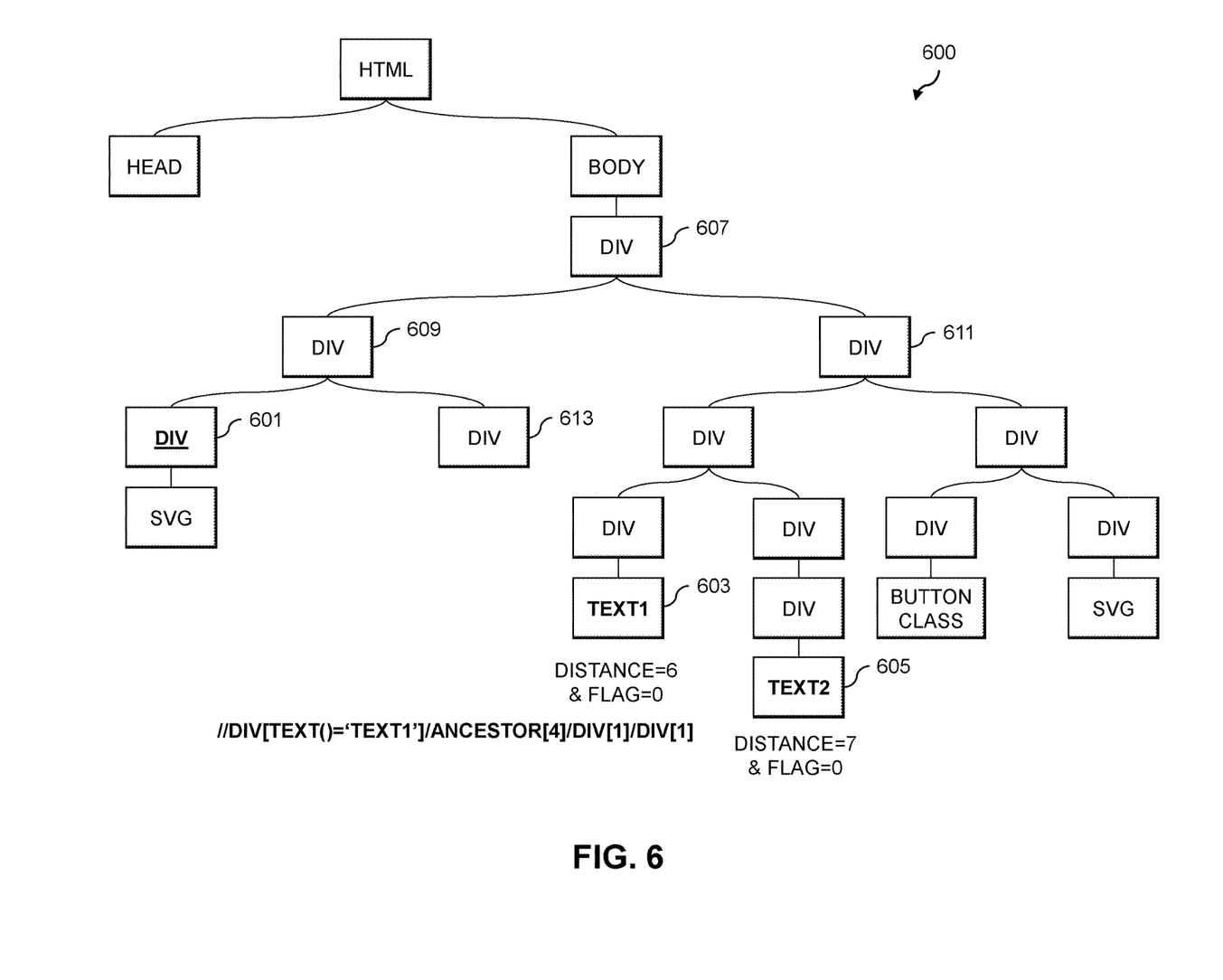
FIG. 6 is an example of determining a path to a dynamic web element in a dynamic web page comprising multiple text field web elements that are part of different branches of the dynamic web page relative to the dynamic web element in an illustrative embodiment.

FIGS. 4-6 show examples of path determinations in different tree structures representing web elements of web pages. The tree structure may comprise a DOM interface of the web page (e.g., an XML or HTML document) comprising the given web element whose path is to be determined.

FIG. 4 shows a DOM tree structure 400 in the case where there is only one text containing web element present. The DOM tree structure 400 includes a set of HTML tags, including an HTML tag, a header tag (e.g., <head>), a body tag (e.g., <body>), multiple division or section tags (e.g., <div>) and one text tag "text1." In the FIG. 4 example, the given web element is the <div> tag 401 that is bold and underlined. The XPath for the <div> tag 401 is determined relative to the text1 tag 403 as: //div[text( )='text1']/ancestor::div[2]. The first portion of the XPath "//div[text( )='text1'" indicates the reference static web element (e.g., text1 tag 403), and the second portion of the XPath "ancestor::div[2]" indicates the traversal path from the reference static web element to the given web element (e.g., <div> tag 401) where the "2" in brackets denotes traversing back upwards twice to the given web element.

FIG. 5 shows a DOM tree structure 500 in the case where there are multiple text containing web elements present in the web page, including text containing elements that are and are not in the same branch as the given web element whose path is to be determined. The DOM tree structure 500 includes a set of HTML tags, including an HTML tag, a header tag, a body tag, multiple division or section tags, multiple text tags, a span class tag (e.g., <span>) and a scalable vector graphics tag (e.g., <svg>). In the FIG. 5 example, the given web element is the <div> tag 501 that is bold and underlined. Whereas the FIG. 4 DOM tree structure 400 included just a single text containing element (text1 tag 403), the FIG. 5 DOM tree structure 500 includes three text containing elements, text1 tag 503, text2 tag 505 and text3 tag 507. The text1 tag 503 has a distance of 4 to the <div> tag 501, and has its flag value set to 0 as it is not in the same branch as the <div> tag 501. The text2 tag 505 has a distance of 5 to the <div> tag 501 and has its flag value set to 1 as it is in the same branch as the <div> tag 501. The text3 tag 507 has a distance of 3 to the <div> tag 501 and has its flag value set to 1 as it is in the same branch as the <div> tag 501. The text3 tag 507 is selected, as it is the closest text containing web element that is in the same branch as the <div> tag 501. The XPath for the <div> tag 501 is determined relative to the text3 tag 507 as: //div[text( )='text3'/ancester::div[3]. The first portion of the XPath "//div[text( )='text3'" indicates the reference static web element (e.g., text3 tag 507), and the second portion of the XPath "ancestor::div[3]" indicates the traversal path from the reference static web element to the given web element (e.g., <div> tag 501) where the "3" in brackets denotes traversing back upwards three times to reach the given web element.

FIG. 6 shows a DOM tree structure 600 in the case where there are multiple text containing web elements present in the web page, but none of the text containing web elements are in the same branch as the given web element whose path is to be determined. The DOM tree structure 600 includes a set of HTML tags, including an HTML tag, a header tag, a body tag, multiple division or section tags, multiple scalable vector graphics tags, a button class tag (e.g., <button>), and multiple text tags. In the FIG. 6 example, the given web element is the <div> tag 601 that is bold and underlined. Whereas the FIG. 4 and FIG. 5 DOM tree structures 400 and 500 each included at least one text containing element in the same branch as the given web element whose path is to be determined, the FIG. 6 DOM tree structure 600 includes two text containing elements, text1 tag 603 and text2 tag 605, neither of which is in the same branch as the given web element whose path is to be determined (e.g., <div> tag 601). The text1 tag 603 has a distance of 6 to the <div> tag 601, and has its flag value set to 0 as it is not in the same branch as the <div> tag 601. The text2 tag 605 has a distance of 7 to the <div> tag 601 and has its flag value set to 0 as it is not in the same branch as the <div> tag 601. The text1 tag 603 is selected, as it is the closest text containing web element. The XPath for the <div> tag 601 is determined relative to the text1 tag 603 as: //div[text( )='text1']/ancestor[4]/div[1]/div[1]. The first portion of the XPath "//div[text( )='text1']" indicates the reference static web element (e.g., text1 tag 603) and the second portion of the XPath tag "/ancestor[4]/div[1]/div[1]" indicates the traversal path from the reference static web element to the given web element (e.g., <div> tag 601). More particularly, the section "/ancestor[4]" denotes traversing back upwards four times to <div> tag 607. The section "/div[1]/div[1]" indicates traversing down selecting the first <div> tag element each level down (e.g., in the first level down selecting <div> tag 609 rather than <div> tag 611, and in the second level down selecting <div> tag 601 rather than <div> tag 613).

To determine the closest text containing element, Dijkstra's algorithm may be used to find the shortest path between the given web element and possible reference static web elements. A custom algorithm is used to map the path generated from Dijkstra's algorithm to an XPath using XPath axes and operators. It should be noted that various types of XPath axes and operators may be used, and that embodiments are not limited to the specific XPath axes and operators described above in conjunction with FIGS. 4-6. For example, in addition to using the "ancestor" XPath axis, embodiments may use various other XPath axes representing relationships to a given web element. Such XPath axes include, but are not limited to: ancestor, child, descendant, following, following-sibling, parent, preceding, preceding-sibling, self, etc.

The techniques described herein for detecting and finding stable XPaths in dynamic web pages provides various advantages for web applications. For example, significant manual effort can be saved (e.g., 98% or more) by fetching) (Paths using the techniques described herein (e.g., from manual effort requiring 5-10 minutes to determine an XPath for a given web element to 5-10 seconds to determine the XPath for the given web element). In some testing and automation processes, searching XPaths for 50 web elements manually could take approximately 250 minutes of manual effort. Using the techniques described herein, this time can be brought down to approximately 5-6 minutes. In other words, the techniques described herein allow for automatic fetching of XPaths for approximately 50 web elements in the time it would take existing tools to fetch the XPath for a single web element. Using the techniques described herein, it is also possible to validate test scripts in web applications upon new release or upgrade of web application software.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for determining web element path locations in dynamic web pages will now be described in greater detail with reference to FIGS. 7 and 8. Although described in the context of system 100, these platforms may also be used to implement at least portions of other information processing systems in other embodiments.

Figure 7:
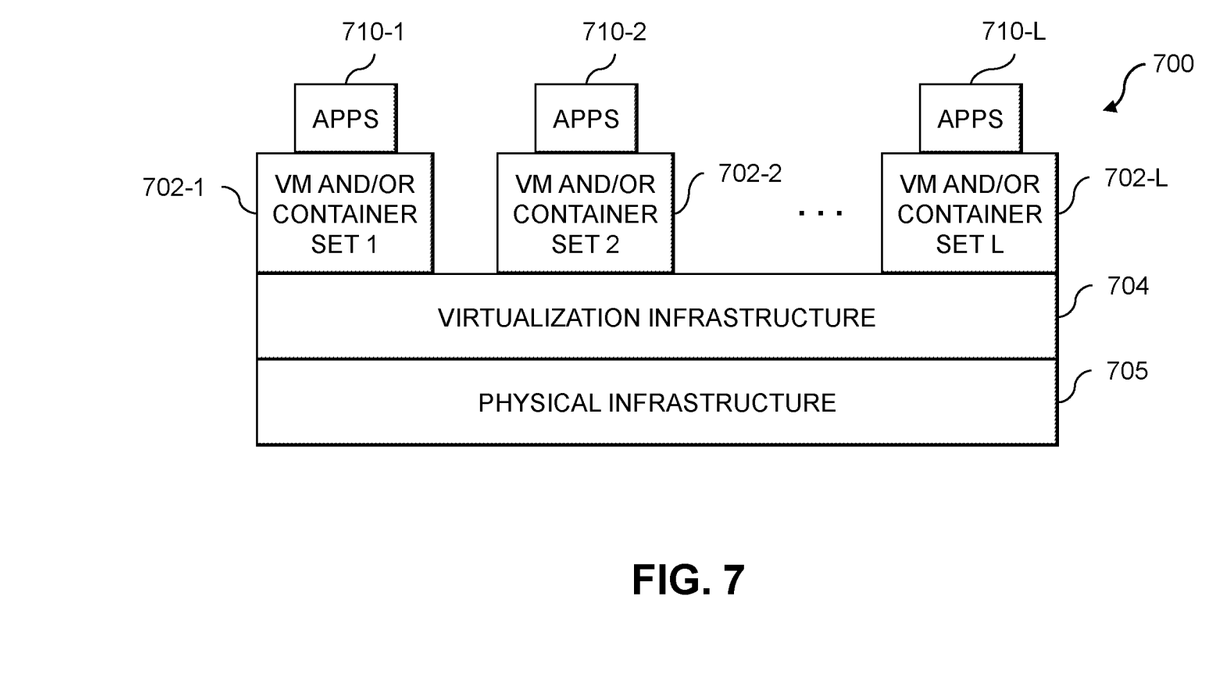
FIGS. 7 and 8 show examples of processing platforms that may be utilized to implement at least a portion of an information processing system in illustrative embodiments.
Figure 8:
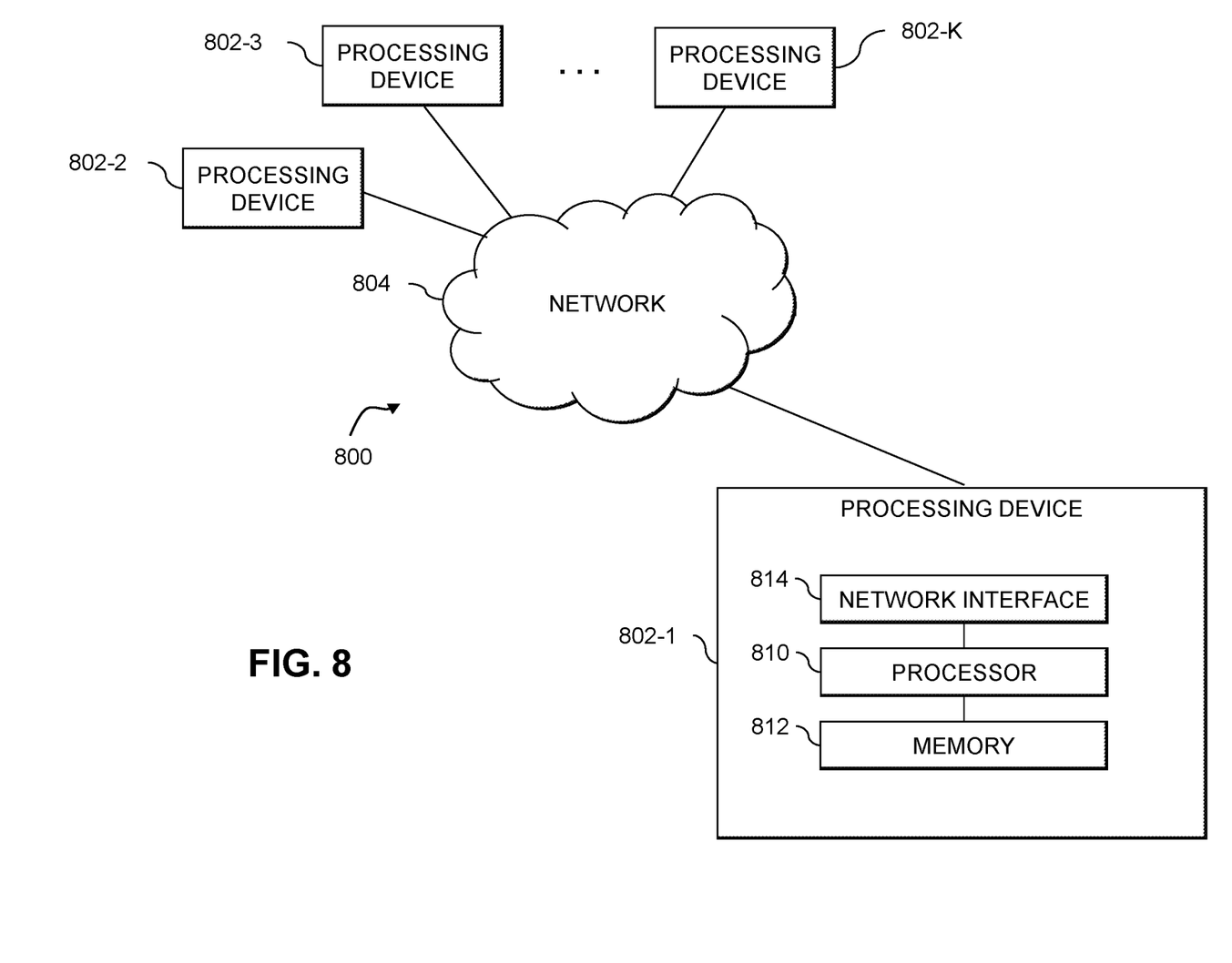

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for determining web element path locations in dynamic web pages as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, web applications, web pages, web element types, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising
at least one processing device comprising a processor coupled to a memory;
the at least one processing device being configured to perform steps of:
receiving a request to determine a path to a given web element of a web page of a web application, the given web element having a first likelihood of changing over time;
parsing the web page of the web application to detect a plurality of web elements of the web page, the plurality of web elements comprising the given web element and one or more additional web elements;
identifying one or more of the additional web elements having one or more designated characteristics, the one or more designated characteristics indicating that the identified web elements have a second likelihood of changing over time, the second likelihood being less than the first likelihood;
selecting one of the identified web elements having the one or more designated characteristics based at least in part on locations of the identified web elements, relative to the given web element, in a tree structure of the web page of the web application; and
determining a given path to the given web element from the selected web element that does not traverse a root node of the tree structure of the web page of the web application.

2. The apparatus of claim 1 wherein identifying one or more of the additional web elements having the one or more designated characteristics comprises identifying ones of the plurality of web elements comprising text fields of the web page of the web application.

3. The apparatus of claim 1 wherein the web page of the web application comprises a Hypertext Markup Language (HTML) page, and wherein identifying one or more of the additional web elements having the one or more designated characteristics comprises identifying ones of the additional web elements comprising at least one of a header HTML tag, a paragraph HTML tag, and a label HTML tag.

4. The apparatus of claim 1 wherein the path to the given web element comprises an Extensible Markup Language (XML) Path Language (XPath) path.

5. The apparatus of claim 1 wherein the tree structure of the web page of the web application comprises a Document Object Model (DOM) tree structure comprising nodes representing the plurality of web elements.

6. The apparatus of claim 5 wherein the given web element has an absolute path to the root node of the DOM tree structure that changes over time.

7. The apparatus of claim 5 wherein the given web element has at least one of a class and an identifier that changes over time.

8. The apparatus of claim 5 wherein identifying one or more of the additional web elements having the one or more designated characteristics comprises identifying two or more of the additional web elements having the one or more designated characteristics, and wherein selecting one of the identified web elements is based at least in part on respective numbers of steps for traversing the DOM tree structure to the given web element from each of the two or more additional web elements having the one or more designated characteristics.

9. The apparatus of claim 5 wherein identifying one or more of the plurality of web elements having the one or more designated characteristics comprises identifying two or more of the additional web elements having the one or more designated characteristics, and wherein selecting one of the identified web elements is based at least in part on whether respective ones of the two or more additional web elements having the one or more designated characteristics lie in a same branch of the DOM tree structure as the given web element.

10. The apparatus of claim 5 wherein selecting one of the identified web elements comprises:
determining whether at least a subset of the identified web elements lie in a same branch of the DOM tree structure as the given web element;
responsive to determining that at least a subset of the identified web elements lie in the same branch of the DOM tree structure as the given web element, selecting the identified web element in the subset that has a shortest traversal path to the given web element; and
responsive to determining that none of the identified web elements lie in the same branch of the DOM tree structure as the given web element, selecting the identified web element that has a shortest traversal path to the given web element.

11. The apparatus of claim 1 wherein the path to the given web element comprises a path defined using one or more Extensible Markup Language (XML) Path Language (XPath) axes and operators.

12. The apparatus of claim 11 wherein the given path to the given web element comprises a first portion specifying the selected web element and a second portion specifying a traversal path of the tree structure of the web page of the web application from the selected web element to the given web element.

13. The apparatus of claim 1 wherein identifying one or more of the plurality of web elements having the one or more designated characteristics comprises identifying one or more fields of the given web element as having the one or more designated characteristics.

14. The apparatus of claim 13 wherein determining the given path to the given web element comprises determining a path to the given web element from the one or more fields of the given web element having the one or more designated characteristics.

15. A method comprising steps of:
receiving a request to determine a path to a given web element of a web page of a web application, the given web element having a first likelihood of changing over time;
parsing the web page of the web application to detect a plurality of web elements of the web page, the plurality of web elements comprising the given web element and one or more additional web elements;
identifying one or more of the additional web elements having one or more designated characteristics, the one or more designated characteristics indicating that the identified web elements have a second likelihood of changing over time, the second likelihood being less than the first likelihood;
selecting one of the identified web elements having the one or more designated characteristics based at least in part on locations of the identified web elements, relative to the given web element, in a tree structure of the web page of the web application; and
determining a given path to the given web element from the selected web element that does not traverse a root node of the tree structure of the web page of the web application;
wherein the method is performed by at least one processing device comprising a processor coupled to a memory.

16. The method of claim 15 wherein the tree structure of the web page of the web application comprises a Document Object Model (DOM) tree structure comprising nodes representing the plurality of web elements, and wherein selecting one of the identified web elements comprises:
determining whether at least a subset of the identified web elements lie in a same branch of the DOM tree structure as the given web element;
responsive to determining that at least a subset of the identified web elements lie in the same branch of the DOM tree structure as the given web element, selecting the identified web element in the subset that has a shortest traversal path to the given web element; and
responsive to determining that none of the identified web elements lie in the same branch of the DOM tree structure as the given web element, selecting the identified web element that has a shortest traversal path to the given web element.

17. The method of claim 15 wherein the given path to the given web element comprises a path defined using one or more Extensible Markup Language (XML) Path Language (XPath) axes and operators, and wherein the given path to the given web element comprises a first portion specifying the selected web element and a second portion specifying a traversal path of the DOM tree structure from the selected web element to the given web element.

18. A computer program product comprising a non-transitory processor-readable storage medium having stored therein program code of one or more software programs, wherein the program code when executed by at least one processing device causes the at least one processing device to perform steps of:
receiving a request to determine a path to a given web element of a web page of a web application, the given web element having a first likelihood of changing over time;
parsing the web page of the web application to detect a plurality of web elements of the web page, the plurality of web elements comprising the given web element and one or more additional web elements;
identifying one or more of the additional web elements having one or more designated characteristics, the one or more designated characteristics indicating that the identified web elements have a second likelihood of changing over time, the second likelihood being less than the first likelihood;
selecting one of the identified web elements having the one or more designated characteristics based at least in part on locations of the identified web elements, relative to the given web element, in a tree structure of the web page of the web application; and
determining a given path to the given web element from the selected web element that does not traverse a root node of the tree structure of the web page of the web application.

19. The computer program product of claim 18 wherein the tree structure of the web page of the web application comprises a Document Object Model (DOM) tree structure comprising nodes representing the plurality of web elements, and wherein selecting one of the identified web elements comprises:
determining whether at least a subset of the identified web elements lie in a same branch of the DOM tree structure as the given web element;
responsive to determining that at least a subset of the identified web elements lie in the same branch of the DOM tree structure as the given web element, selecting the identified web element in the subset that has a shortest traversal path to the given web element; and
responsive to determining that none of the identified web elements lie in the same branch of the DOM tree structure as the given web element, selecting the identified web element that has a shortest traversal path to the given web element.

20. The computer program product of claim 18 wherein the given path to the given web element comprises a path defined using one or more Extensible Markup Language (XML) Path Language (XPath) axes and operators, and wherein the given path to the given web element comprises a first portion specifying the selected web element and a second portion specifying a traversal path of the DOM tree structure from the selected web element to the given web element.

* * * * *